No. 668,544. Patented Feb. 19, 1901.
T. J. RYAN.
GATE HINGE.
(Application filed Jan. 11, 1900.)
(No Model.)

Witnesses
Fred C. Stuart
R. S. Orwig

Inventor: Timothy J. Ryan
By J. Ralph Orwig, Atty

UNITED STATES PATENT OFFICE.

TIMOTHY J. RYAN, OF DES MOINES, IOWA.

GATE-HINGE.

SPECIFICATION forming part of Letters Patent No. 668,544, dated February 19, 1901.

Application filed January 11, 1900. Serial No. 1,069. (No model.)

*To all whom it may concern:*

Be it known that I, TIMOTHY J. RYAN, a citizen of the United States, residing at Des Moines, in the county of Polk and State of Iowa, have invented a new and useful Improvement in Gate Supporting and Operating Devices, of which the following is a specification.

The object of this invention is to provide a gate supporting and operating device of simple, strong, durable, and inexpensive construction by means of which the outer end of the gate is automatically raised above the ground-surface when the gate is opened, so as to clear obstructions in the roadway and at the same time to so elevate the gate as to permit it to automatically close; and my object is, further, to provide in this connection a gate-hinge by which the entire gate may be easily and quickly raised and lowered with relation to the ground-surface, so that when there is snow on the ground or other obstructions the gate may be operated without necessitating the removal of the snow.

My invention consists in certain details in the construction, arrangement, and combination of the various parts of the hinge, as hereinafter more fully set forth, pointed out in my claim, and illustrated in the accompanying drawings, in which—

Figure 1:
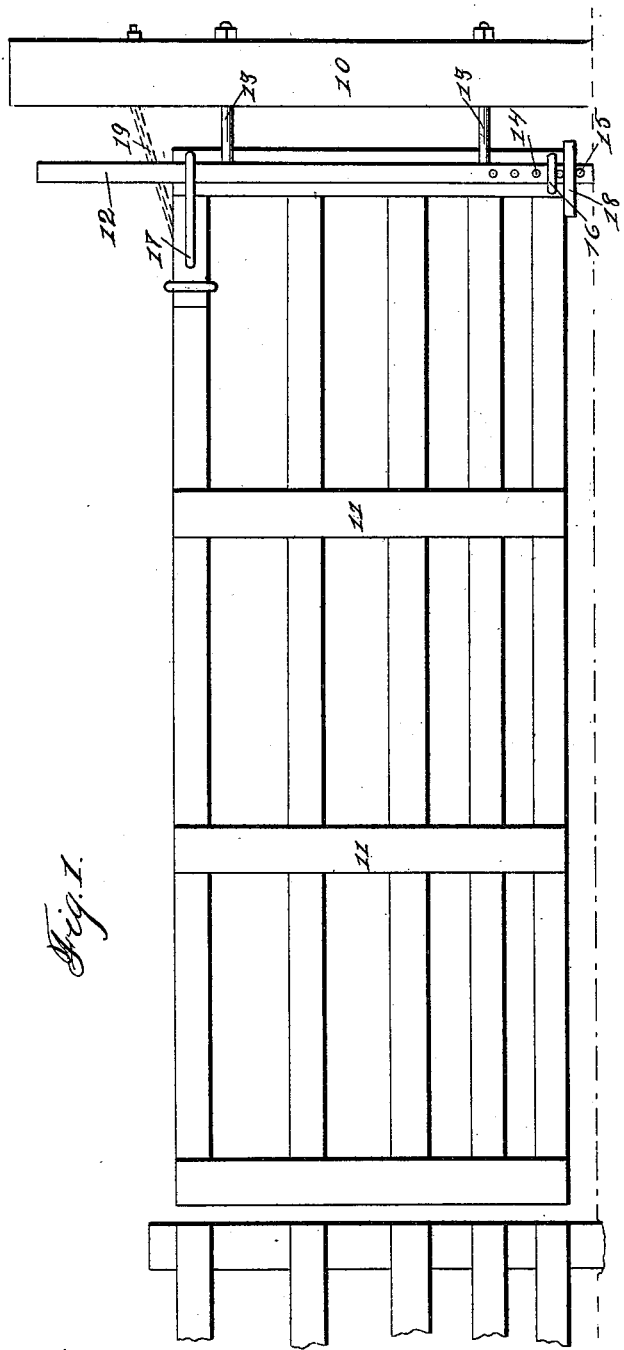
Figure 2:
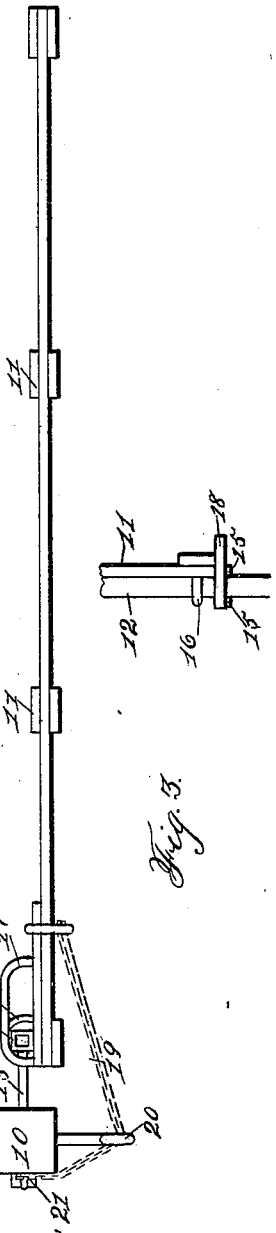
Figure 3:
Figure 3:

Figure 1 shows a gate having my improved hinge thereon in side elevation. Fig. 2 shows a top or plan view of the same. Fig. 3 shows a top end view of the lower portion of the gate and hinge.

Referring to the accompanying drawings, I have used the reference-numeral 10 to indicate the gate-post, and 11 to indicate a gate of ordinary construction.

The reference-numeral 12 indicates a tubular upright placed a slight distance from the post and with its lower end in the ground, its upper end projecting a considerable distance above the top of the gate. This upright is firmly connected with the gate by means of two bolts 13, and at the lower end of the tubular upright 12 is a series of openings 14 to receive a pin 15 for purposes hereinafter made clear.

The gate proper is provided with two staples. The lower one, 16, is of a size to closely fit around the upright 12 and is secured to the gate near its lower end. The other staple, 17, is secured near the top of the gate and overlaps the upright 12, but is made considerably longer than the lower staple.

The reference-numeral 18 indicates a plate placed upon the lower end of the upright 12 and designed to pass under the corner-upright of the gate. This plate 18 is made vertically adjustable upon the upright 12 by means of the pin 15, and it serves to support the end of the gate against vertical movement. At the top of the gate a chain 19 is attached to the gate and the side opposite from the staple 17, passed through an arm 20, projecting laterally from the post, and finally attached to the post at 21.

In practical use and assuming that the parts of the gate and gate supporting and operating device are connected and assembled as shown and described it is obvious that upon opening the gate toward the side opposite from the chain 19 the said chain will draw the top end of the gate toward the post, thereby raising the outer end of the gate above the ground. It is obvious that when the gate passes a line at right angles to its closed position it will tend to swing farther open; but if the gate is in any position between the said right-angle position and its closed position it will tend to close automatically by reason of the outer end. It is obvious, further, that the entire gate may be raised so as to clear obstructions upon the roadway—as, for instance, snow—by raising the plate 18 and placing the pin 15 through one of the openings 14 in said elevated position.

Having thus described my invention, what I claim, and desire to secure by Letters Patent of the United States therefor, is—

A gate-hinge, comprising an upright, means for rigidly supporting said upright adjacent to a gate-post, a staple or loop designed to accurately fit the lower portion of the upright and to be rotatably connected with the upright and to be fixed to the lower portion of a gate, an elongated loop to be fixed to the upper portion of the gate and to receive the upper portion of the upright and permit the outer end of the gate to be raised and lowered to a limited extent, means for supporting the inner end of the gate upon the upright to prevent the gate from sliding downwardly with relation to the upright, in combination with a chain adapted to be attached to the gate and to the gate-post above its point of attachment to the gate, for the purposes stated.

TIMOTHY J. RYAN.

Witnesses:
THOMAS G. ORWIG,
J. RALPH ORWIG.